US009675200B2

(12) United States Patent
Hsu

(10) Patent No.: US 9,675,200 B2
(45) Date of Patent: Jun. 13, 2017

(54) BREWING MACHINE

(71) Applicant: Tien-Chang Hsu, Keelung (TW)

(72) Inventor: Tien-Chang Hsu, Keelung (TW)

( * ) Notice: Subject to any disclaimer, the term of this patent is extended or adjusted under 35 U.S.C. 154(b) by 264 days.

(21) Appl. No.: 14/671,146

(22) Filed: Mar. 27, 2015

(65) Prior Publication Data

US 2016/0113433 A1    Apr. 28, 2016

(30) Foreign Application Priority Data

Oct. 23, 2014 (TW) .............................. 103218833 U

(51) Int. Cl.
*A47J 31/46* (2006.01)
*A47J 31/06* (2006.01)
*A47J 31/18* (2006.01)
*A47J 31/52* (2006.01)

(52) U.S. Cl.
CPC ........... *A47J 31/0615* (2013.01); *A47J 31/18* (2013.01); *A47J 31/52* (2013.01)

(58) Field of Classification Search
USPC .................................................. 99/280, 283
See application file for complete search history.

(56) References Cited

U.S. PATENT DOCUMENTS

| | | | | |
|---|---|---|---|---|
| 5,188,019 A * | 2/1993 | Vahabpour | ............. | A47J 31/18 137/606 |
| 6,135,010 A * | 10/2000 | Husted | .................. | A47J 31/002 99/283 |
| 7,225,728 B2 * | 6/2007 | Lyall, III | ............ | A47J 31/0576 426/433 |
| 8,534,186 B2 * | 9/2013 | Glucksman | ............. | A47J 31/20 99/282 |
| 2008/0199580 A1 * | 8/2008 | Accumanno | ............ | A47J 31/02 426/435 |
| 2008/0202346 A1 * | 8/2008 | Accumanno | ............ | A47J 31/02 99/280 |
| 2012/0073448 A1 * | 3/2012 | Husted | .................... | A47J 31/52 99/283 |
| 2012/0225176 A1 * | 9/2012 | DiStefano | ............... | A47J 31/52 426/435 |
| 2013/0167731 A1 * | 7/2013 | Eidenbenz | .......... | A47J 31/0615 99/283 |
| 2013/0220136 A1 * | 8/2013 | De Jong | ............. | A47J 27/2105 99/285 |

* cited by examiner

*Primary Examiner* — Quang D Thanh
*Assistant Examiner* — Renee Larose
(74) *Attorney, Agent, or Firm* — Muncy, Geissler, Olds & Lowe, P.C.

(57) ABSTRACT

The present invention provides a brewing machine, including: a brewing container, a valve device with a timer function, a timer and a seat frame. The brewing container is mounted on the valve device for brewing tea. The valve device is placed on the seat frame, and is capable of switching between a blocking position and an opening position. The timer can be used to set a brewing time. When the pre-set brewing time is up, the timer will switch the valve device to the opening position, so the brewed tea may flow into a container placed on the seat frame from the brewing container through the valve opening. With the brewing machine of the present invention, the over brewing situations which may cause the bitterness in the taste of the brewed tea can be prevented, and the convenience of the tea brewing process is also improved.

8 Claims, 6 Drawing Sheets

BREWING MACHINE

CROSS-REFERENCE TO RELATED APPLICATION

This application claims the priority of Taiwanese patent application No. 103218833, filed on Oct. 23, 2014, which is incorporated herewith by reference.

BACKGROUND OF THE INVENTION

1. Field of the Invention

The present invention relates to a machine for brewing, and more particularly, relates to a brewing machine capable of setting an optimum brewing time and capable of letting the brewed tea automatically flows out when the pre-set time is up.

2. The Prior Arts

When using conventional tea kettles or other tea brewing appliances for brewing tea, in order to prevent the tea leaves from being soaked for too long and resulting in the tea being too thick, the user usually has to rely on a timer or rely on their own mind to watch out for the brewing time carefully. Since different types of tea requires different brewing time, and even the same type of tea may require different brewing time for each brew, the tea can easily be over-brewed and become too thick to drink. In addition, even with the help of a timer, it still requires man power to pour the brewed tea into a tea pot or a tea cup from the brewer, which can be rather inconvenient.

SUMMARY OF THE INVENTION

Based on the above reasons, a primary objective of the present invention is to provide a brewing machine that has a timer function for setting an optimum brewing time, and has the capability of automatically letting the brewed tea flows out when the pre-set time is up by opening a valve therein. In this way, not only the over brewing situations can be prevented, but the convenience in the tea brewing process can also be improved.

For achieving the foregoing objectives, the present invention provides a brewing machine, including: a brewing container, a filter, a valve device having a timer function, and a timer. The brewing container has a first end, a second end and an inner space. The first end of the brewing container is an open end, and a through hole is disposed at the second end of the brewing container. The filter is disposed inside the brewing container for covering the through hole. The valve device having a timer function is attached to the second end of the brewing container. The valve device further includes: a housing, a magnetic valve and an actuating mechanism. The housing has a recess portion, and a valve opening in communication with the through hole is disposed in the recess portion. The magnetic valve is placed at the valve opening for blocking the valve opening. The actuating mechanism is disposed inside the housing and includes a power source, a motor, a sliding rail, a gear rack and a magnet. The gear rack is slidably mounted on the sliding rail, the magnetic is attached at an end of the sliding rail, the power source is electrically connected to the motor, and a gear disposed at a driving end of the motor is engaged with the gear rack. The timer is disposed inside the housing, and controls the motor of the actuating mechanism to move the magnet between an opening position and a blocking position based on a pre-set time. When the magnet is moved to the opening position by the actuating mechanism via the control of the timer, the magnet is located next to the valve opening so as to attract the magnet valve to move away from the valve opening; when the magnet is moved to the blocking position by the actuating mechanism, the magnet is kept away from the valve opening and the recess portion, so the magnetic valve is released from the attraction of the magnet and returns to the valve opening to block the valve opening.

According to an embodiment of the present invention, the brewing machine further includes a seat frame. The seat frame consists of a connecting part, a plurality of supporting pillars and a base. The connecting part is supported by the supporting pillars at a height from the base for mounting the valve device, and a seat frame through hole is disposed on the connecting part in correspondence with the valve opening. In addition, a drainage tray is disposed on the base.

According to an embodiment of the present invention, a refraining plate is disposed on the recess portion for covering the recess portion.

According to an embodiment of the present invention, the timer further includes a control panel and a circuit board. The control panel is disposed on a surface of the housing, and the circuit board is fixed inside the housing.

According to an embodiment of the present invention, the filter further includes: a filter frame, a silicon ring, a filter disc and a gripping member. The filter frame has a shape corresponding to a shape of the through hole; the silicon ring is sleeved around an outer peripheral surface of the filter frame for tight fitting with the through hole of the brewing container; the filter disc has a plurality of filtering holes; and the gripping member is disposed through the filter disc and is fixed to the filter frame.

According to an embodiment of the present invention, a connecting portion is disposed at the second end of the brewing container, and a connecting structure is disposed on an outer peripheral surface of the connecting portion. The connecting structure is engaged with an engaging structure disposed on an inner peripheral surface of the recess portion of the valve device, so as to mount the brewing container on the valve device.

According to an embodiment of the present invention, the brewing container further includes a cap for covering the open end of the brewing container.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
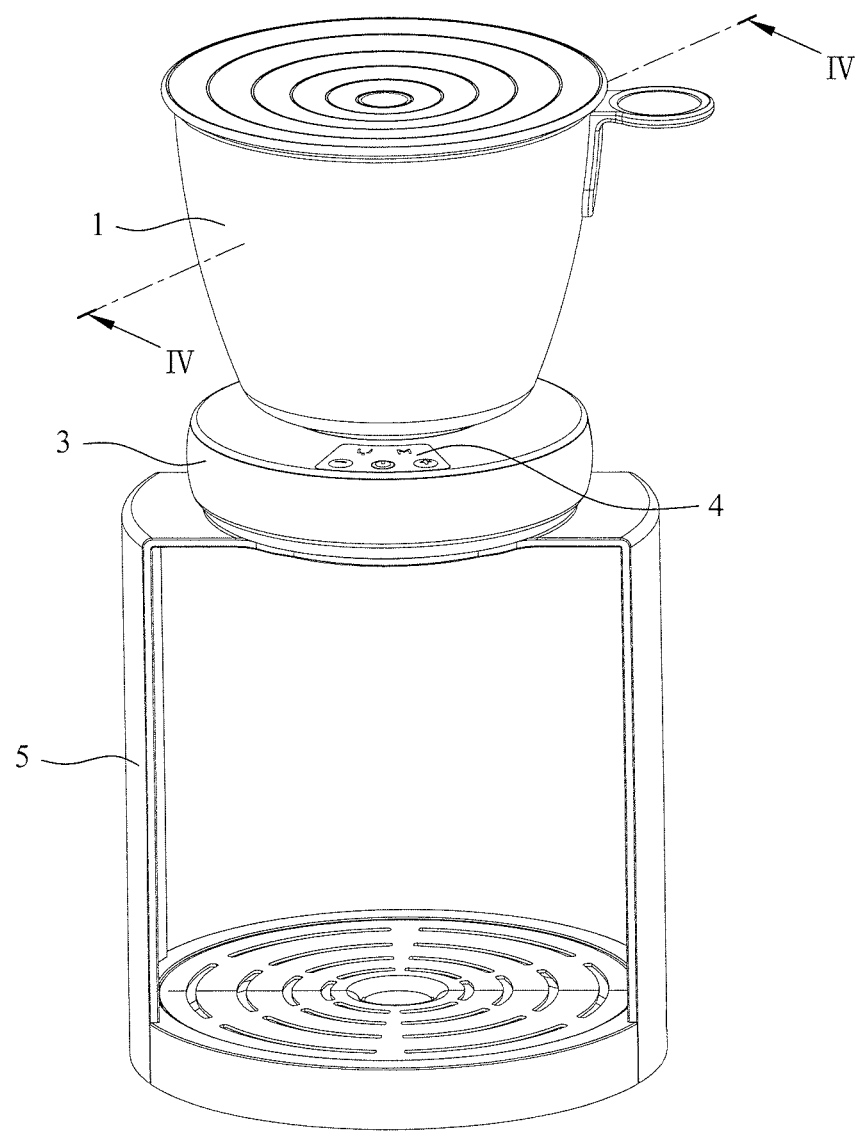
FIG. 1 is a perspective view illustrating a brewing machine according to a preferred embodiment of the present invention.
Figure 2:
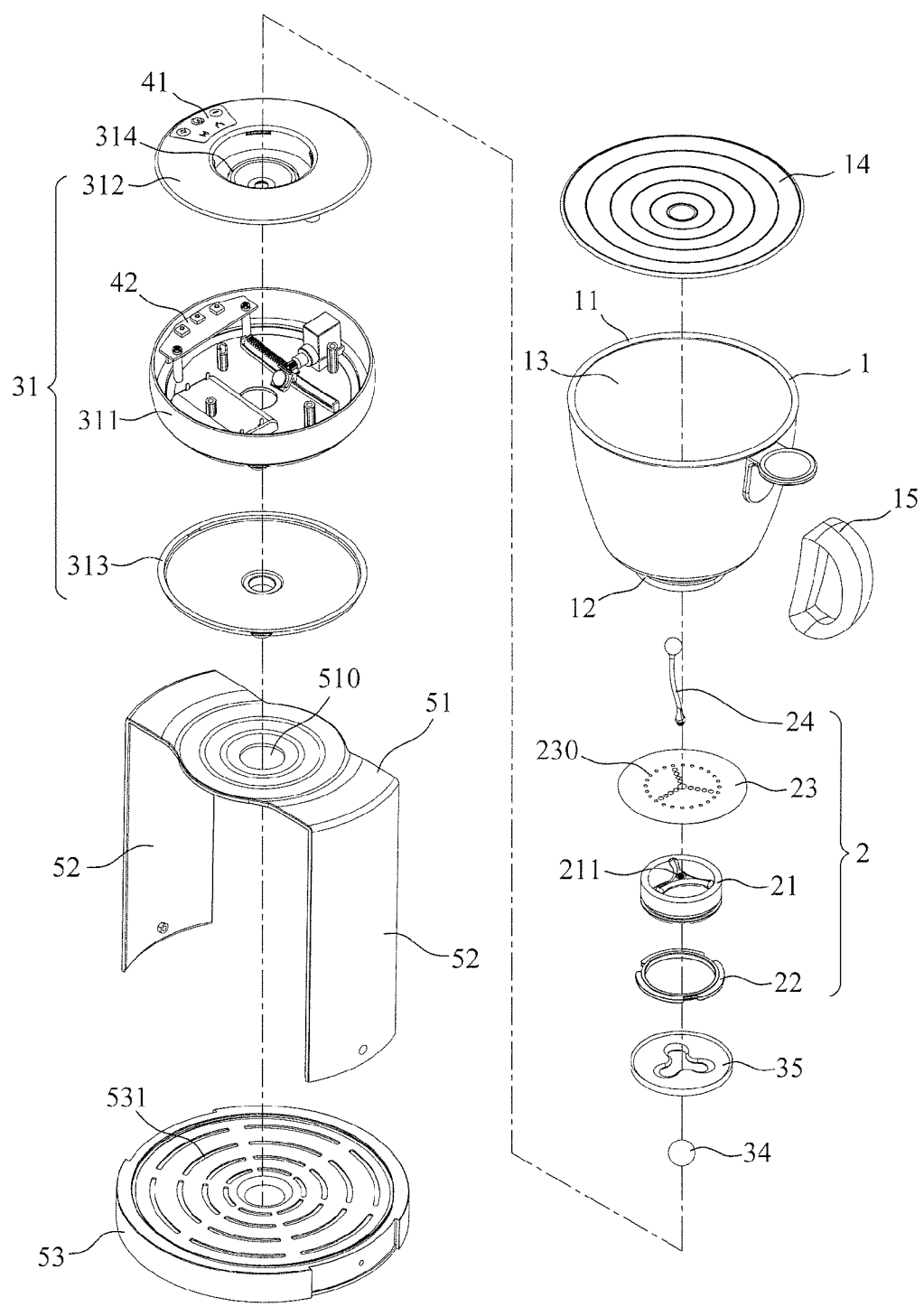
FIG. 2 is a perspective and exploded view illustrating the brewing machine according to the preferred embodiment of the present invention.

FIG. 1 is a perspective view illustrating a brewing machine according to a preferred embodiment of the present invention, and FIG. 2 is a perspective and exploded view illustrating the brewing machine according to the preferred embodiment of the present invention. As shown in FIG. 1 and FIG. 2, the brewing machine of the present invention includes: a brewing container 1, a filter 2, a valve device 3 with a timer function, a timer 4 and a seat frame 5. In the following section, the structure of each component will be explained in details with reference to the attached drawings.

The brewing container 1, which is a container for brewing tea, has a first end 11, a second end 12 and an inner space 13. The first end 11 is an open end through which the user may put the tea leaves to be brewed into the inner space 13 of the brewing container 1. A through hole 120 (shown in FIG. 4) is disposed at the second end 12 of the brewing container 1. In addition, in the preferred embodiment of the present invention, the brewing container 1 also includes a cover 14 for covering the first end 11 of the brewing container 1, and a grip 15 disposed at a side edge of the container for the user to grip on.

The filter 2 is placed inside the inner space 13 of the brewing container 1 for covering the through hole 120. In the preferred embodiment of the present invention, the filter 2 includes a filter frame 21, a silicon ring 22, a filter disc 23 and a gripping part 24. The filter frame 21 has a shape corresponding to a shape of the through hole 120 of the brewing container 1, and has a plurality of ribs 211 that are connected with each other at the center thereof. The silicon ring 22 is sleeved around an outer peripheral surface of the filter frame 21. The filter disc 23 has a plurality of filtering holes 230, and the filtering holes 230 are distributed on the filter disc 23 in correspondence with the shape of the ribs 211 of the filter frame 21. The gripping member 24 is disposed through the filter disc 23 and is fixed to the ribs 211 of the filter frame 21 by ways of thread engagement. The filter 2 of the present invention is thus assembled.

Figure 3:
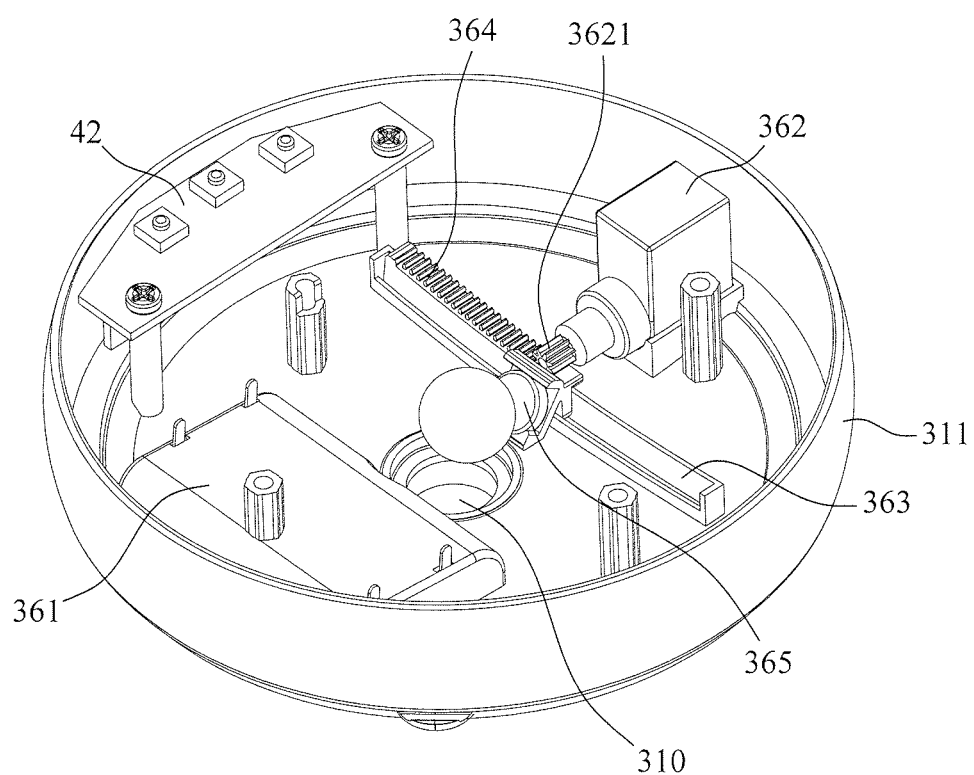
FIG. 3 is a perspective view illustrating a valve device with a timer function according to the preferred embodiment of the present invention.

The valve device 3 with the timer function is attached to the second end 12 of the brewing container 1, and is capable of controlling the flow of the tea inside the brewing container 1 based on a time set by the user. FIG. 3 is a perspective view illustrating the valve device 3 according to the preferred embodiment of the present invention. As shown in FIGS. 1-3, in the preferred embodiment of the present invention, the valve device mainly includes a housing 31, a magnetic valve 34, a refraining plate 35 and an actuating mechanism. The housing 31 consists of a housing body 311, an upper cover 312 and a bottom cover 313. A recess portion 314 is disposed on the upper cover 312. The recess portion 314 of the upper cover 312, the housing body 311 and the bottom cover 313 each has an opening disposed corresponding with one another. In such a way, a valve opening 310 is formed on the housing 31 in correspondence to the through hole 120 of the brewing machine 1. The magnetic valve 34 is an iron ball, and is placed at the valve opening 310 for blocking the valve opening. The refraining plate 35 is placed on the recess portion 314 for covering the recess portion 314, so as to keep the magnetic valve 34 from falling out from the recess portion 314.

In the preferred embodiment of the present invention, the actuating mechanism includes a power source 361, a motor 362, a sliding rail 363, a gear rack 364 and a magnet 365. The power source 361 can be any common dry cell batteries, and can be installed inside the battery compartment shown in FIG. 3 to be covered by the bottom cover 313. The power source 361 is electrically connected with the motor 362. The sliding rail 363 is disposed at a side of the valve opening 310, and the gear rack 364 is slidably disposed on the sliding rail 363. The magnet 365 is mounted at an end of the gear rack 364. The motor 362 is disposed in the vicinity of the valve opening 310 and is on the same side thereof as the sliding rail 363. A gear 3621 is disposed at a driving end of the motor 362 for engaging with the gear rack, so as to drive the gear rack 364 and the magnet 365 to move.

As shown in FIGS. 1-3, the timer 4 includes a control panel 41 and a circuit board 42. The control panel 41 is disposed on a surface of the upper cover 312 of the housing 31, and the circuit board 42 is fixed inside the housing 31.

The seat frame 5 is a frame used for holding the valve device 3 and the brewing container 1. The seat frame 5 consists of a connecting part 51, two supporting pillars 52 and a base 53. The connecting part 51 is supported by the supporting pillars 52 at a height from the base 53 for mounting the valve device 3. A seat frame through hole 510 is disposed on the connecting part 51 in correspondence with the valve opening 310. In addition, a drainage tray 531 is disposed on the base 53 of the seat frame 5.

Figure 4:
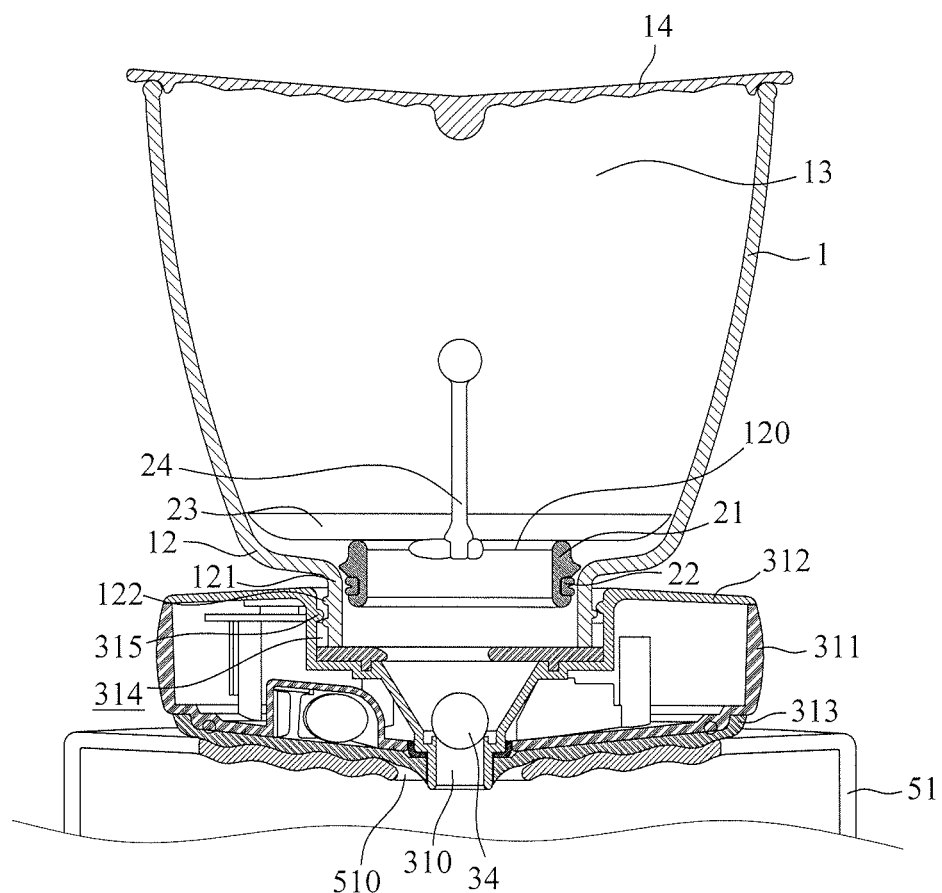
FIG. 4 is a side section view illustrating a brewing container, the valve device and a seat frame according to the preferred embodiment of the present invention.

The components having the abovementioned structure and configurations can be assembled into the brewing machine 1 of the present invention. Next, the assembling process of the abovementioned components will be explained with reference to FIG. 4. As shown in FIG. 4, after placing the filter frame 21 of the filter 2 inside the through hole 120 of the brewing container 1, the user may grip the gripping part 24 to press the filter 2 downward, so the filter 2 can be tight fitted with the through hole 120 of the brewing container 1 by the silicon ring 22 sleeved around the outer peripheral of the filter frame 21. By installing the filter 2 inside the inner space 13 of the brewing container 1, the filter disc 23 may act to refrain the residuals of tea brewing, such as tea leaves, from flowing outward via the through hole 120.

The second end 12 of the brewing container 1 is detachably mounted inside the recess portion 314 of the valve device 3, thereby lowering the chance of the brewing container 1 getting knocked over by accident. As shown in FIG. 4, a connecting portion 121 is disposed at the second end 12 of the brewing container 1, and a connecting structure 122 is disposed on an outer peripheral surface of the connecting portion 121. The connecting structure 121 is engaged with an engaging structure 315, which is disposed on an inner peripheral surface of the recess portion 314 of the valve device 3, so as to securely mount the brewing container 1 on the valve device 3. In the preferred embodiment of the present invention, the connecting structure 122 and the engaging structure 315 are a male thread and a female thread, respectively. The brewing container 1, the filter 2 and the valve device 3 assembled according to the above description can be placed on the seat frame 5 at the convenience of the user, as shown in FIG. 4.

With the brewing machine of the present invention, the user may set an optimum brewing time via the timer 4 to control the flow of the brewed tea with the valve device 3. In this way, not only the over brewing situations can be prevented, but the convenience in the tea brewing process can also be improved. When operating the brewing machine of the present invention, before the water is added into the brewing container 1, the brewing material such as tea leaves is put into the inner space 13 of the brewing container 1 through the first end 11 thereof. Subsequently, the user may prepare a receiving container for receiving the brewed tea and place it on the base 53 of the seat frame 5. Next, the user may operate the control panel 41 on the surface of the housing 31 to set the time manually or automatically. In this way, when the pre-set time is up, the brewed tea will automatically flow into the receiving container from the brewing container 1 through the valve opening 310 due to the valve mechanism of the valve device 3, and the user may enjoy the brewed tea at ease. In the following sections, the valve mechanism of the valve device 3 will be explained in details with reference to FIGS. 5-6.

Figure 5:
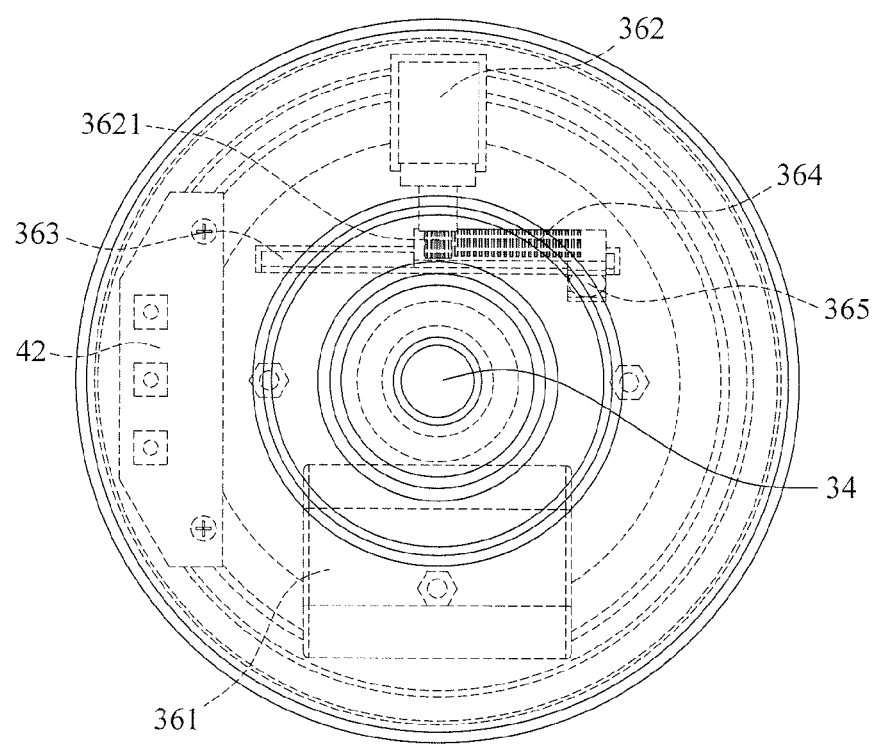
FIG. 5 is a top view illustrating the valve device according to the preferred embodiment of the present invention at a blocking position.

The valve device 3 is able to move the magnetic valve between an opening position and a blocking position. FIG. 5 is a top view showing the valve device at the blocking position. As shown in FIG. 5, in order to keep the brewed tea inside the brewing container with the magnetic valve 34, normally, the magnetic valve 34 of the valve device 3 is located at the blocking position, in which the valve opening 310 is blocked by the magnetic valve 34. When the magnetic valve 34 is at the blocking position, the magnet 365 mounted on the gear rack 364 is at a position away from the valve opening 310 and the recess portion 314, as shown in FIG. 5.

Figure 6:
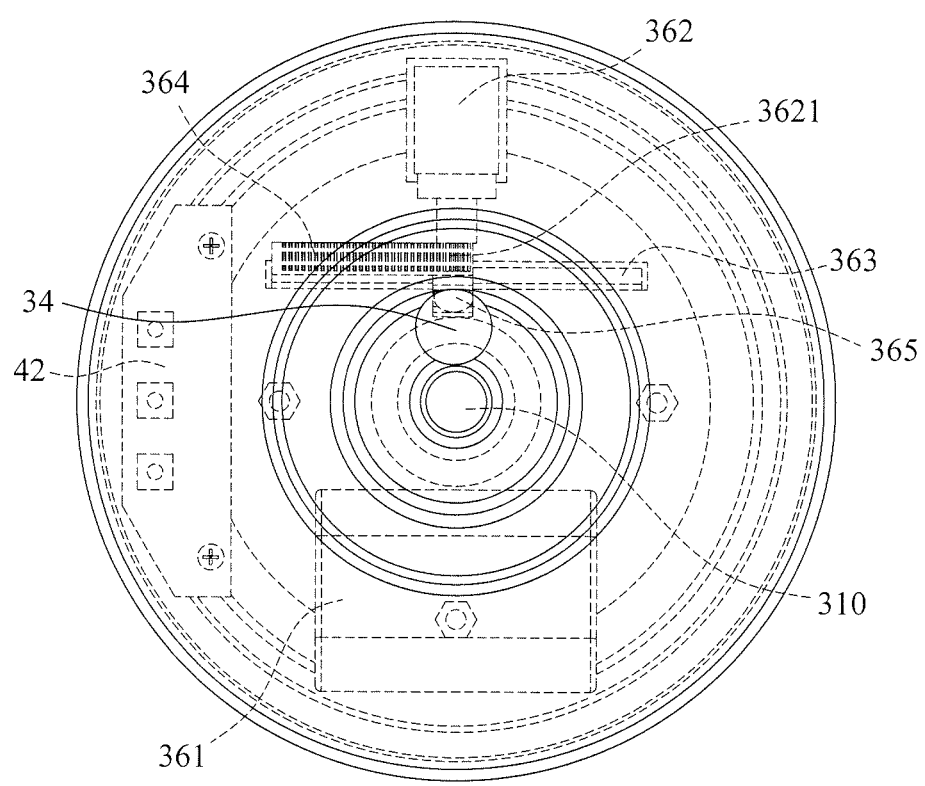
FIG. 6 is a top view illustrating the valve device according to the preferred embodiment of the present invention at an opening position.

When the user pre-set time is up, the timer 4 will move the valve device 3 to the opening position shown in FIG. 6. Specifically, the motor 362 of the valve device 3 is driven to rotate, so the gear 3621 at the driving end of the motor 362 may drive the gear rack 364 to move the magnet 365 to a position next to the valve opening 310. When the magnet 365 is next the to valve opening 310, the magnet 365 will attract the magnetic valve 34 to move away from the valve opening 310, so the brewed tea may flow into the receiving container from the brewing container through the valve opening 310. When the brewed tea are all flowed into the receiving container, the motor 362 of the actuating mechanism may drive the gear 3621 to rotate in a reverse direction to move the magnet 364 to a position away from the valve opening 310 and the recess portion shown in FIG. 5. In such a way, the magnetic valve 34 may be released from the attraction of the magnet 34 due to the inner peripheral wall of the recess portion 314, and thus returning to the blocking position show in FIG. 5. When the brewing process is completed, the user may disengaged the brewing container 1 from the valve device 3 to clean out the brewing residual such as tea leaves.

According to the disclosure of the present invention, the timer function provided by the brewing machine of the present invention makes it possible for the brewed tea to flow into the receiving container from the brewing container automatically based on a pre-set time, so the user is spared from paying close attention to the brewing time for the whole brewing process. As a result, not only the over brewing situations can be prevented, but the convenience in the tea brewing process can also be improved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A brewing machine, comprising:
   a brewing container having a first end, a second end and an inner space, wherein the first end is an open end, and a through hole is disposed at the second end of the brewing container;
   a filter disposed inside the brewing container for covering the through hole; and
   a valve device having a timer function and attached to the second end of the brewing container, the valve device further comprising:
   a housing having a recess portion, wherein a valve opening in communication with the through hole is disposed in the recess portion;
   a magnetic valve placed at the valve opening for blocking the valve opening;
   an actuating mechanism disposed inside the housing and including a power source, a motor, a sliding rail, a gear rack and a magnet, wherein the gear rack is slidably mounted on the sliding rail, the magnet is attached at an end of the gear rack, the power source is electrically connected to the motor, and a gear disposed at a driving end of the motor is engaged with the gear rack;
   a timer disposed inside the housing, wherein the timer controls the motor of the actuating mechanism to move the magnet between an opening position and a blocking position based on a pre-set time;
   wherein when the magnet is moved to the opening position by the actuating mechanism via the control of the timer, the magnet is located next to the valve opening so as to attract the magnetic valve to move away from the valve opening;
   wherein when the magnet is moved to the blocking position by the actuating mechanism, the magnet is kept away from the valve opening and the recess portion, so the magnetic valve is released from the attraction of the magnet and returns to the valve opening to block the valve opening.

2. The brewing machine according to claim 1 further comprising a seat frame having a connecting part, a plurality of supporting pillars and a base, wherein the connecting part is supported by the supporting pillars at a height from the base for mounting the valve device, and a seat frame through hole is disposed on the connecting part in correspondence with the valve opening.

3. The brewing machine according to claim 2, wherein a drainage tray is disposed on the base.

4. The brewing machine according to claim 1, wherein a refraining plate is disposed on the recess portion.

5. The brewing machine according to claim 1, wherein the timer further includes a control panel and a circuit board, the control panel is disposed on a surface of the housing, and the circuit board is fixed inside the housing.

6. The brewing machine according to claim 1, wherein the filter further comprises:
   a filter frame having a shape corresponding to a shape of the through hole;
   a silicon ring sleeved around an outer peripheral surface of the filter frame for tight fitting with the through hole of the brewing container;
   a filter disc having a plurality of filtering holes; and
   a gripping member disposed through the filter disc and fixed to the filter frame.

7. The brewing machine according to claim 1, wherein a connecting portion is disposed at the second end of the brewing container, and a connecting structure is disposed on an outer peripheral surface of the connecting portion, wherein the connecting structure is engaged with an engaging structure disposed on an inner peripheral surface of the recess portion of the valve device so as to mount the brewing container on the valve device.

8. The brewing machine according to claim 1, wherein the brewing container further includes a cap for covering the open end of the brewing container.

* * * * *